Nov. 17, 1953 A. F. W. HELMBOLD Re. 23,736

ATTACHMENT FOR PRESSING IRONS

Original Filed July 12, 1950

INVENTOR.
AUGUST F. W. HELMBOLD

BY

Joseph A. Rane
Attorney

Reissued Nov. 17, 1953 Re. 23,736

UNITED STATES PATENT OFFICE 23,736

ATTACHMENT FOR PRESSING IRONS

August F. W. Helmbold, Fort Thomas, Ky.

Original No. 2,618,729, dated November 18, 1952, Serial No. 173,422, July 12, 1950. Application for reissue July 16, 1953, Serial No. 368,545

6 Claims. (Cl. 219—29)

Matter enclosed in heavy brackets [ ] appears in the original patent but forms no part of this reissue specification; matter printed in italics indicates the additions made by reissue.

This invention relates to new and useful improvements and structural refinements in devices for scraping paint, and the principal object of the invention is to provide a device of the character herein described which, in the nature of an attachment, may be applied to a conventional pressing iron, so that the heat emanating from the iron may be utilized for loosening and softening the paint, which is to be scraped.

An important feature of the invention, therefore, resides in the combination of the scraper with the conventional pressing iron, while another feature lies in the provision of means for removably retaining the scraper in position on the iron.

Some of the advantages of the invention reside in its simplicity of construction, in its efficient operation, and in its adaptability to economical manufacture.

With the above more important objects and features in view, and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
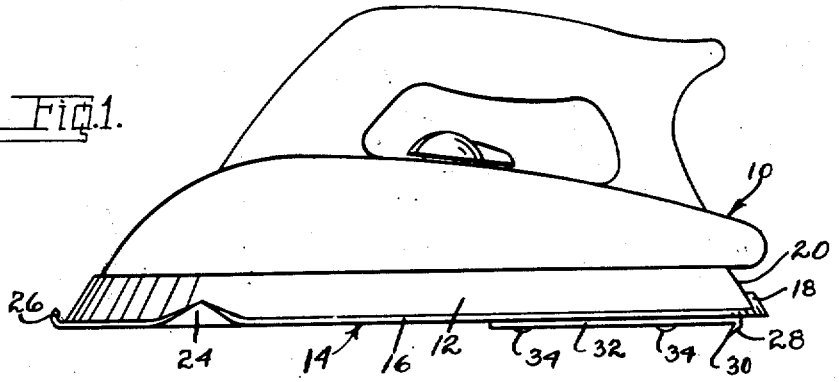
Figure 1 is a side elevational view of the invention.
Figure 2:
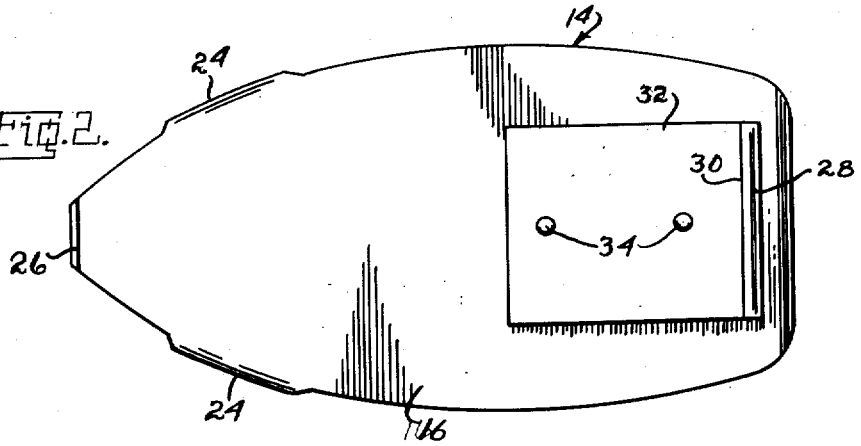
Figure 2 is an underside plan view thereof.
Figure 3:
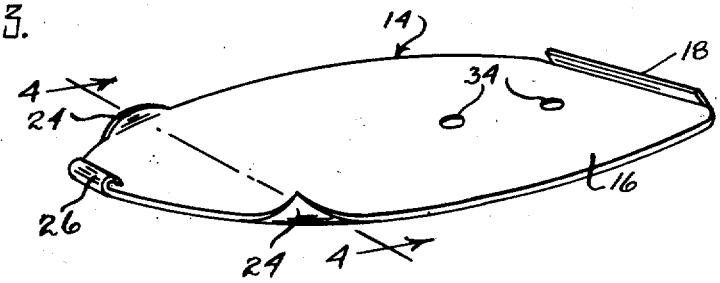
Figure 3 is a top perspective view of the scraper attachment per se.
Figure 4:
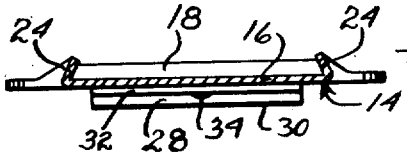
Figure 4 is a transverse sectional view, taken substantially in the plane of the line 4—4 in Figure 3.

Referring now to the accompanying drawings in detail, the general reference character 10 designates a conventional pressing iron, the same including a bottom plate 12 and containing the usual electric heating element (not shown) for substantially heating the bottom plate, as will be clearly understood.

The invention resides in the provision of a paint scraper attachment which is designated generally by the reference character 14 and embodies in its construction a panel 16 which is adapted to be positioned under and conforms substantially to the bottom 12 of the iron, the panel 16 having a straight, transverse rear edge provided with an upwardly and forwardly extending flange retainer 18 which abuts the rear edge 20 of the bottom plate 12, as shown in Figure 1. Moreover, resilient, upwardly projecting retainers [22]*24* are formed integrally at opposite side edges of the panel 16 adjacent the front end thereof, the purpose of these retainers being to frictionally engage opposite side edges of the plate 12 so as to removably sustain the panel in position under the iron. Needless to say, by virtue of their resiliency, the retainers 24 may be spread apart so as to disengage the same from the bottom 12 when the attachment is to be separated from the iron.

The panel 16 is provided at the front end thereof with an upwardly arcuated nose 26 which prevents the front end of the scraper attachment from catching the work when the device is slid along the surface from which the paint is to be scraped, while the actual scraping operation is effected by a downwardly and forwardly extending scraping flange 28 which has a sharp work engaging edge 30 and is disposed transversely under the panel 16 adjacent the rear edge of the latter. The flange 28 is formed integrally with a mounting portion or plate 32 which underlies the panel 16 and is secured thereto by a plurality of rivets 34.

When in operation, the pressing iron 10 together with the attachment 14 is simply slid along a surface from which paint is to be removed, and although only the nose piece 26 and the edge 30 of the scraper blade or flange 28 is in actual contact with the paint, the entire area of the panel 16 and the plate 32 is in close proximity to the work and is heated by the pressing iron 10 so that the paint will be substantially softened and loosened in advance of the scraper flange, as the device moves along.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

*1.* In a paint scrapping device, the combination of a heating unit including a housing having a flat bottom, a pair of forwardly convergent side edges terminating in a pointed front end and a transverse rear edge extending between said side edges at the rear end of the housing, a flat panel of heat conductive material coextensive with and positioned under said bottom in contact with the same, an upturned flange provided at the rear edge of said panel and frictionally engaging the rear edge of said housing, substantially triangular upturned detents provided at opposite side edges of the panel and engaging the corresponding side edges of the housing, an upwardly and rearwardly arcuate and transversely elongated roll provided at the front end of the panel and disposed forwardly of the pointed front end of the housing, a flat plate secured to the underside of the rear end portion of said panel, and a downwardly and forwardly extending flange provided at the rear edge of said plate parallel to and spaced forwardly from the first mentioned flange, said downwardly and forwardly extending flange constituting a scraper blade.

*2. A paint scraper comprising in combination an electric heater including a bottom plate, a housing upstanding from said bottom plate, electric means within the housing adapted to heat the bottom plate, said bottom plate having an area defined by a forward point, a transverse rear edge and side edges substantially tapered from the ends of the transverse rear edge to the forward point, a panel of an area conforming substantially to the area of the bottom plate and defined by a forward end, a transverse rear edge and side edges substantially tapered from the ends of its transverse rear edge to its forward end, said panel being adapted to be in close physical contact with the bottom plate throughout the area thereof so that said panel is heated by said bottom plate, means integral with the panel edges outwardly thereof for releasably engaging the corresponding edges of the bottom plate, and a scraping flange depending from the panel transversely thereof inwardly of its transverse rear edge.*

*3. A paint scraper comprising in combination an electric heater including a bottom plate, a housing upstanding from said bottom plate, electric means within the housing adapted to heat the bottom plate, said bottom plate having an area defined by a forward point, a transverse rear edge and side edges substantially tapered from the ends of the transverse rear edge to the forward point, a panel of an area conforming substantially to the area of the bottom plate and defined by a forward end, a transverse rear edge and side edges substantially tapered from the ends of its transverse rear edge to its forward end, said panel being adapted to be in close physical contact with the bottom plate throughout the area thereof so that said panel is heated by said bottom plate, means integral with the panel edges outwardly thereof for releasably engaging the corresponding edges of the bottom plate, a scraping flange depending from the panel transversely thereof inwardly of its transverse rear edge, and means integral with the forward end of the panel for sheathing the forward point of the bottom plate.*

*4. A paint scraper comprising in combination an electric heater including a bottom plate, a housing upstanding from said bottom plate, electric means within the housing adapted to heat the bottom plate, said bottom plate having an area defined by a forward point, a transverse rear edge and side edges substantially tapered from the ends of the transverse rear edge to the forward point, a panel of an area conforming substantially to the area of the bottom plate and defined by a forward end, a transverse rear edge, and side edges substantially tapered from the ends of its transverse rear edge to its forward end, said panel being adapted to be in close physical contact with the bottom plate throughout the area thereof so that said panel is heated by said bottom plate, means integral with the panel edges outwardly thereof for releasably engaging the corresponding edges of the bottom plate, a scraping flange depending from the panel transversely thereof inwardly of its transverse rear edge, and a forwardly projecting mounting plate integral with the scraper flange through which it is secured to the panel.*

*5. As an article of manufacture a paint scraper attachment for the bottom plate of a pressing iron comprising a panel of an area conforming substantially to the area of the bottom plate of a pressing iron with said area defined by a forward end, a transverse rear edge and side edges substantially tapered from the ends of its transverse rear edge to its forward end, said panel being adapted to be mounted on the pressing iron bottom plate in face contact throughout the area thereof, means integral with the panel edges outwardly thereof for releasably mounting the panel, and a scraping flange depending from the panel transversely thereof inwardly of its transverse rear edge.*

*6. As an article of manufacture a paint scraper attachment for the bottom plate of a pressing iron comprising a panel of an area conforming substantially to the area of the bottom plate of a pressing iron with said area defined by a forward end, a transverse rear edge and side edges substantially tapered from the ends of its transverse rear edge to its forward end, said panel being adapted to be mounted on the pressing iron bottom plate in face contact throughout the area thereof, means integral with the panel edges outwardly thereof for releasably mounting the panel, a scraping flange depending from the panel transversely thereof inwardly of its transverse rear edge, a forwardly projecting mounting plate integral with the scraping flange through which it is secured to the panel, and means integral with the forward end of the panel to upstand therefrom.*

AUGUST F. W. HELMBOLD.

References Cited in the file of this patent or the original patent

UNITED STATES PATENTS

| Number | Name | Date |
|---|---|---|
| 1,664,429 | Multhaup | Apr. 3, 1928 |
| 2,308,047 | Blakeslee | Jan. 12, 1943 |
| 2,315,121 | King | Mar. 30, 1943 |
| 2,458,530 | Resnick | Jan. 11, 1949 |
| 2,497,535 | Carlino | Feb. 14, 1950 |
| 2,612,586 | Berarducci et al. | Sept. 30, 1952 |